(12) United States Patent
Mayblum et al.

(10) Patent No.: US 8,260,265 B1
(45) Date of Patent: Sep. 4, 2012

(54) INSTANT MESSAGING THROUGH SECONDARY WIRELESS COMMUNICATION DEVICE

(75) Inventors: Amir Mayblum, Walnut Creek, CA (US); Alice Yuan, Morristown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/186,718

(22) Filed: Jul. 20, 2011

(51) Int. Cl.
*H04M 1/752* (2006.01)

(52) U.S. Cl. .................. 455/412.2; 455/466; 455/412.1; 370/390; 370/432; 370/352; 709/205; 709/206; 709/207; 709/224

(58) Field of Classification Search .... 455/412.1–412.2, 455/414.4, 416–417, 455–466; 370/390, 370/432, 352; 340/7.43, 7.51; 719/315–316; 379/93.24, 100.08, 265.09; 709/205–207, 709/217–218, 224

See application file for complete search history.

(56) References Cited

U.S. PATENT DOCUMENTS

| | | | |
|---|---|---|---|
| 7,739,508 B2 * | 6/2010 | Lord et al. ..................... | 713/175 |
| 2002/0034281 A1 * | 3/2002 | Isaacs et al. ............... | 379/88.12 |
| 2003/0208545 A1 * | 11/2003 | Eaton et al. ................... | 709/206 |
| 2005/0111653 A1 * | 5/2005 | Joyce et al. ............... | 379/265.09 |
| 2005/0187781 A1 * | 8/2005 | Christensen ..................... | 705/1 |
| 2005/0223075 A1 * | 10/2005 | Swearingen et al. ........ | 709/207 |
| 2005/0228680 A1 * | 10/2005 | Malik ............................. | 705/1 |
| 2005/0255868 A1 * | 11/2005 | Dehlin ........................... | 455/466 |
| 2006/0288077 A1 * | 12/2006 | Chen ............................. | 709/206 |
| 2008/0183832 A1 * | 7/2008 | Kirkland et al. .............. | 709/206 |

\* cited by examiner

*Primary Examiner* — Rafael Pérez-Gutiérrez
*Assistant Examiner* — Keith Fang

(57) ABSTRACT

A secondary wireless communication device may send and receive instant messages by causing a primary wireless communication device to send and receive the messages on behalf of the secondary wireless mobile communication device through a cellular communication system. To accomplish this, the primary and secondary devices may wirelessly communicate with one another through a connection other than the cellular communication system. Synchronization of instant messages between the primary and secondary devices may be maintained whenever the devices are in communication.

20 Claims, 8 Drawing Sheets

| Features | Phone Only | Synced | Not Synced |
|---|---|---|---|
| Contacts | | | ✓ |
| Draft | | | ✓ |
| Delivery Reports (Phone master. Read only in tablet) | ✓ | | |
| SMS Messages | | ✓ | |
| MMS | | ✓ | |
| Delete Messages | | ✓ | |
| Message Notifications | | ✓ | |
| Signature | | | ✓ |
| Quick Text | | | ✓ |
| Personalization | | | ✓ |
| Gallery, Voice, Favorite location, recently used | | | ✓ |
| Delete Old Messages Setting | ✓ | | |
| Other Un-synced settings should be displayed as read only in Tablet | | | |

FIG. 8

INSTANT MESSAGING THROUGH SECONDARY WIRELESS COMMUNICATION DEVICE

BACKGROUND

1. Technical Field

This disclosure relates to wireless mobile communication devices and to instant messaging.

2. Description of Related Art

Wireless communication devices, such as mobile phones, are often used to send and receive instant messages, such as SMS and MMS messages.

Sometimes, however, the user interface on the device may make it difficult to send and receive such messages. For example, keyboards on mobile phones can so small as to be difficult to operate quickly with accuracy. One person, moreover, may own several wireless communication devices. It can be inconvenient for the person to switch from a device that is being used and that may not have messaging capability, such as a tablet computer, to a device that does, such as a mobile phone.

SUMMARY

A secondary wireless communication device may send and receive instant messages by causing a primary wireless communication device to send and receive the messages on behalf of the secondary wireless mobile communication device through a cellular communication system. To accomplish this, the secondary and primary wireless communication devices may wirelessly communicate with one another. This wireless communication may take place other than through the cellular communication system. Synchronization of instant messages between the two may be maintained.

The primary wireless communication device may include a cellular communication system configured to wireless communicate instant messages over a cellular communication network. A message storage system may store the instant messages. A messaging module may allow a user to create the instant messages. Each may be addressed to a target cellular communication device at a cellular communication network address. The messaging module may also send the messages through the cellular communication system to the target cellular communication device to which they are addressed, receive instant messages addressed to the primary wireless communication device from the cellular communication system, store the sent and received messages in the message storage system, and read the messages in the message storage system. A secondary wireless communication system may wirelessly communicate with a secondary wireless communication device, other than through the cellular communication network. A proxy module may receive instant messages from the secondary wireless communication system that come from the secondary wireless communication device. Each message may be addressed to a target cellular mobile communication device at a cellular communication network address that is not the address of the primary wireless communication device. The proxy module may also cause the received messages to be sent to the target cellular mobile communication device through the cellular communication system. A synchronization module may cause the messages that are sent and received by the messaging module to be replicated in the secondary wireless communication device. The synchronization module may also cause the messages that are received by the proxy module from the secondary wireless communication device to be replicated in the message storage system.

The primary wireless communication device may include a security module that requires authorization before allowing the proxy module to send the messages that are received from the secondary wireless communication device and before allowing the synchronization module to replicate the messages that are sent and received by the messaging module in the secondary wireless communication device.

A read/unread flag and/or a delivery status may be associated with each message. The synchronization module may replicate a change in the status of the read/unread flag and/or the delivery indicator made in the primary wireless communication device with the secondary wireless communication device and vice versa.

The messaging module may allow a user to delete an instant message. The synchronization module may cause a message that has been deleted by the user to be deleted from the secondary wireless communication device and a message that has been deleted by the secondary wireless communication device to be deleted from the primary wireless communication device.

The cellular communication network address of the target mobile cellular communication device may be a cellular phone number.

The synchronization module may cause instant messages that were sent and received by the primary cellular communication device over the cellular communication network while not in communication with the secondary wireless communication device to be replicated in the secondary wireless communication device, after communication between the primary cellular communication device and the secondary wireless communication device is established. Similarly, the synchronization module may cause instant messages that were created in the secondary wireless communication device while not in communication with the primary cellular communication device to be received from the secondary wireless communication device, sent over the cellular communication network, and stored in the message storage system, after communication between the secondary wireless communication device and the primary cellular communication device is established.

The messaging module, the secondary wireless communication system, and the proxy module may perform their respective functions, as recited above, in connection with multiple different secondary wireless communication devices.

The secondary wireless communication system may communicate with the secondary wireless communication device using Bluetooth and/or Wi-Fi.

The secondary wireless communication device may include a message storage system configured to store instant messages. A messaging module in the secondary wireless communication device may allow a user to create instant messages. Each may be addressed to a target cellular mobile communication device at a cellular communication network address. The messaging module in the secondary wireless communication device may store the messages in the message storage system and read the messages in the message storage system. A secondary wireless communication system in the secondary wireless communication device may wirelessly communicate instant messages with the primary wireless communication device, other than through a cellular communication network. A synchronization module in the secondary wireless communication device may send the messages through the secondary wireless communication system to the primary wireless communication device that is not at the cellular communication network address. The synchronization module in the secondary wireless communication device may receive instant messages from the primary wireless communication device through the secondary wireless communication system that are addressed to the primary wireless communication device and store the received messages in the message storage system.

The secondary wireless communication device may include a security module configured to require authorization before allowing the synchronization module in the secondary wireless communication device to send or receive the messages.

The synchronization module in the secondary wireless communication device may be configured to replicate a change in the status of the read/unread flag made in the secondary wireless communication device with the primary cellular communication device and vice versa.

The messaging module in the secondary wireless communication device may allow a user to delete an instant message. The synchronization module in the secondary wireless communication device may cause a message that has been deleted by the user to be deleted from the primary cellular communication device, and cause a message that has been deleted by the primary wireless communication device to be deleted from the secondary wireless communication device.

The messaging module in the secondary wireless communication device may include a user interface that signals a user when the secondary wireless communication device and the primary cellular communication device are in communication with one another.

The synchronization module in the secondary wireless communication device may cause instant messages that were created in the messaging module while the secondary wireless communication device was not in communication with the primary cellular communication device to be sent to the primary cellular communication device, after communication between the secondary wireless communication device and the primary cellular communication device is established. Similarly, the synchronization module in the secondary wireless communication device may cause instant messages that were sent and received by the primary cellular communication device while not in communication with the secondary wireless communication device to be received from the primary cellular communication device and stored in the message storage system, after communication between the secondary wireless communication device and the primary cellular communication device is established.

The synchronization module in the secondary wireless communication device may seek user permission before causing one or more of the messages that were created in the messaging module while the secondary wireless communication device was not in communication with the primary cellular communication device to be sent to the primary cellular communication device, after communication between the secondary wireless communication device and the primary cellular communication device is established.

The secondary wireless communication system may communicate with the primary cellular communication device using Bluetooth and/or Wi-Fi.

The primary wireless communication device may be a mobile phone and the secondary wireless communication device may be a tablet computer.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 8 illustrates an example of options in a synching option table.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
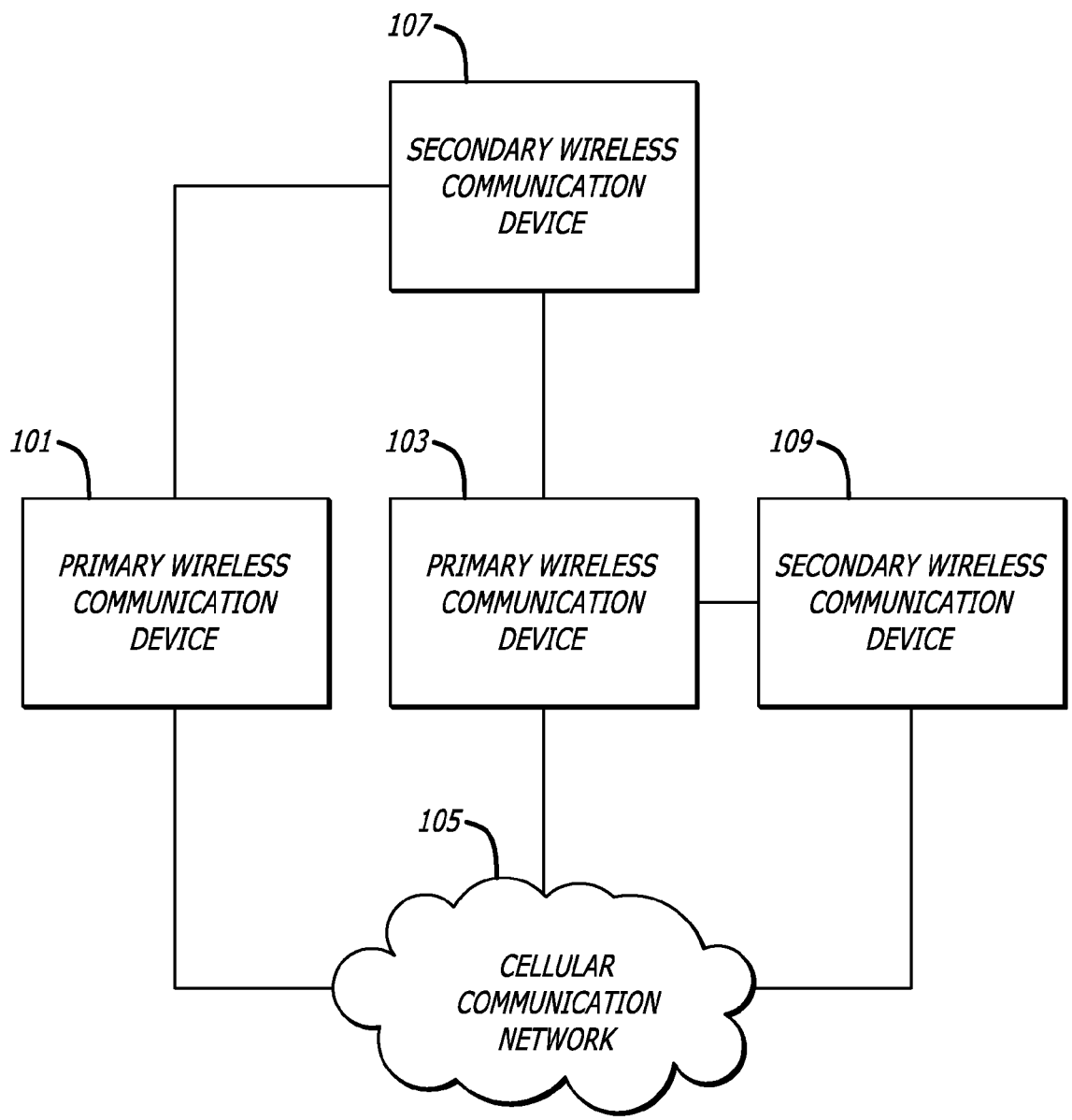
FIG. 1 illustrates two primary wireless communication devices, two secondary wireless communication devices, and a cellular communication network.

FIG. 1 illustrates two primary wireless communication devices, two secondary wireless communication devices, and a cellular communication network. As illustrated in FIG. 1, one or more primary wireless communication devices, such as primary wireless communication devices 101 and 103, may be configured to communicate wirelessly through a cellular communication network 105.

Each primary wireless communication device may be of any type, such as a mobile phone, laptop computer, PDA, or tablet computer. Each primary wireless communication device is configured to wirelessly send and receive instant messages, such as SMS messages and/or MMS messages, through the cellular communication network 105 to target cellular communication devices (not shown).

Each of the primary wireless communication devices is also configured to communicate wirelessly with one or more secondary wireless communication devices, such as secondary wireless communication devices 107 and/or 109. Each primary wireless communication device is configured to communicate with a secondary wireless communication device in a manner other than through the cellular communication network 105. For example, each of the primary wireless communication devices may be configured to communicate wirelessly with one or more of the secondary wireless communication devices using a short range communication network, such as Bluetooth and/or Wi-Fi.

Each of the secondary wireless communication devices is configured to communicate wirelessly with one or more of the primary wireless communication devices, again other than through the cellular communication network 105, such as by using a short range communication network such as Bluetooth and/or Wi-Fi. One or more of the secondary wireless communication devices, such as the secondary wireless communication device 109, may also be configured to communicate instant messages through the cellular communication network 105 using an account that is different than the account used by the primary wireless communication device with which the secondary wireless communication device is able to communicate or actively communicating.

Each secondary wireless communication device may be of any type. For example, each may be a tablet computer, a laptop computer, a PDA, or a mobile phone. Each may have a user interface that facilitates the creation and reading of instant messages more quickly and accurately than the primary wireless communication device with which it may be in communication.

As also illustrated in FIG. 1, a single secondary wireless communication device, such as the secondary wireless communication device 107, may be configured to communicate wirelessly with multiple primary wireless communication devices, such as the primary wireless communication devices 101 and 103, again other than through cellular communication network 105. This may be done simultaneously or at different times. Similarly, each primary wireless communication device, such as the primary wireless communication device 103, may be configured to communicate wirelessly with multiple secondary wireless communication devices, such as the secondary wireless communication devices 107 and 109, again other than through the cellular communication network 105. Again, this may be done simultaneously or at different times.

Figure 2:
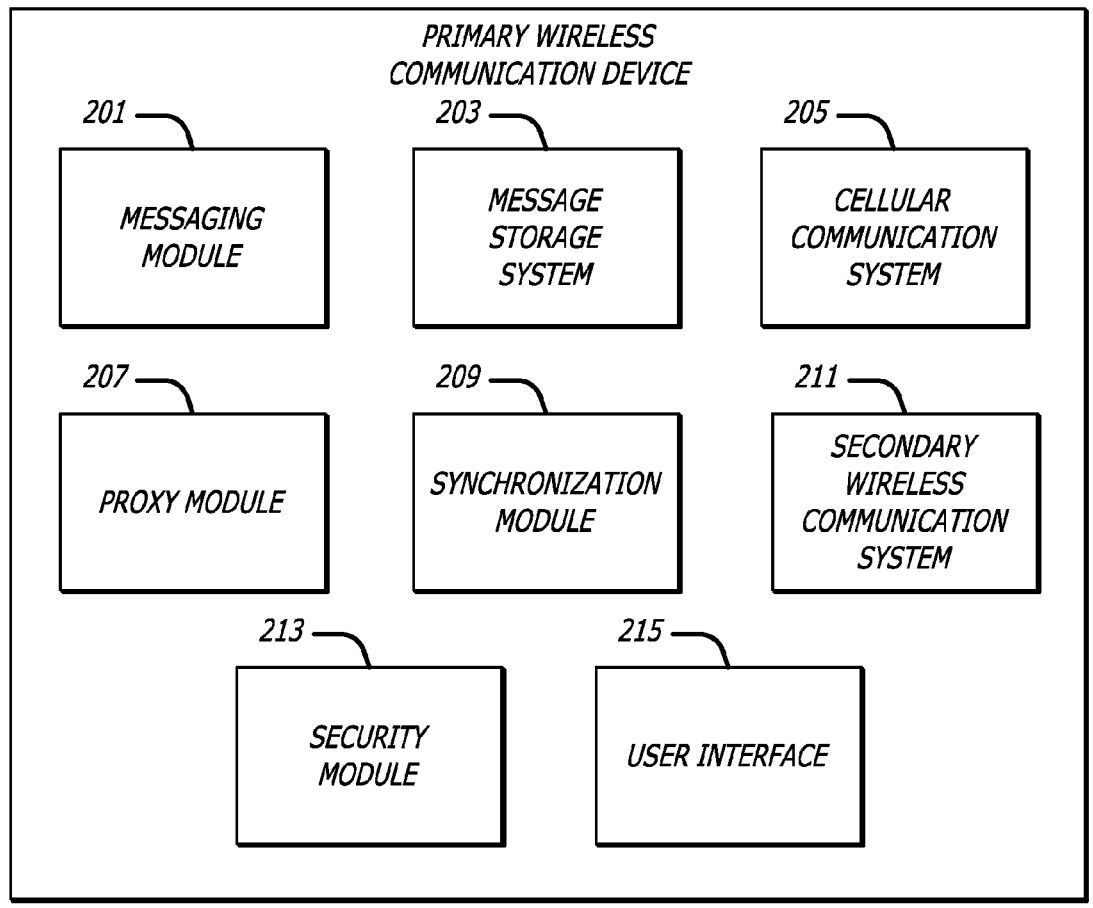
FIG. 2 illustrates an example of one of the primary wireless communication devices illustrated in FIG. 1.

FIG. 2 illustrates an example of one of the primary wireless communication devices illustrated in FIG. 1. As illustrated in FIG. 2, the primary wireless communication device includes a messaging module 201, a message storage system 203, a cellular communication system 205, a proxy module 207, a synchronization module 209, a secondary wireless communication system 211, a security module 213, and a user interface 215.

The cellular communication system 205 is configured to wirelessly send and receive instant messages over a cellular communication network, such as the cellular communication network 105.

The message storage system 203 is configured to store the instant messages. The message storage system 203 may include one or more RAMs (Random Access Memories), flash memories, hard disk drives, and/or other types of computer data storage devices.

The messaging module 201 is configured to allow a user through the user interface 215 to create instant messages. Each instant message is addressed to a cellular target communication device at a cellular communication network address, such as at a cellular phone number. The messaging module 201 is also configured to send these messages through the cellular communication system 205 to the target cellular communication device to which they are addressed.

The messaging module 201 is also configured to receive from the cellular communication system 205 instant messages addressed to the primary wireless communication device. Thus, in one embodiment although an instant message is addressed to only one wireless communication device, it is able to be received by a wireless communication device (secondary wireless communication device) other than the intended wireless communication device (primary wireless communication device), whether or not the secondary wireless communication device has its own address or is able to receive instant messages. The messaging module 201 is also configured to store the sent and received messages in the message storage system 203. The messaging module is also configured to allow a user to read the messages that are stored in the message storage system 203 using the user interface 215.

The secondary wireless communication system 211 is configured to wirelessly communicate with a secondary wireless communication device other than through the cellular communication network 105. For example, the secondary wireless communication system 211 may be configured to communicate with a secondary wireless communication device using a short range communication network, such as Bluetooth and/or Wi-Fi.

The proxy module 207 is configured to receive instant messages from the secondary wireless communication system 211 that come from a secondary wireless communication device that is in communication with the primary wireless communication device, such as the secondary wireless communication device 107 or 109. Each message that is received by the proxy module 207 is addressed to a target cellular mobile communication device at a cellular communication network address, such as at a mobile device number, that is not the address of the primary wireless communication device. The proxy module 207 is also configured to send each received message to the target cellular mobile communication device to which it is addressed through the cellular communication system 205. Thus, the messages that are created on the secondary wireless communication device will appear to the recipient to have come from the same address that is assigned to the primary wireless communication device, such as from its phone number. In one embodiment, the proxy module 207 may not receive instant messages (or communicate through) the cellular network, communicating through the short range communication network.

The synchronization module 209 is configured to cause the messages that are sent and received by the messaging module 201 to be replicated in the secondary wireless communication device that is in communication with the primary wireless communication device. The synchronization module 209 is also configured to cause the messages that are received by the proxy module 207 from the secondary wireless communication device to be replicated in the message storage system 203.

A read/unread (or other) flag may be provided with each instant message. The synchronization module 209 may be configured to replicate a change in the status of the read/unread flag that is made in the primary wireless communication device in the secondary wireless communication device, and vice versa.

The messaging module 201 may be configured to allow a user to delete an instant message using the user interface 215. The synchronization module 209 may be configured to cause a message that has been deleted by the user to be deleted from the secondary wireless communication device. Similarly, the synchronization module 209 may be configured to cause a message that has been deleted by the secondary wireless communication device to be deleted from the primary wireless communication device.

To facilitate these deletions and read/unread flag status changes, the synchronization module 209 may be configured to send and receive notifications to and from the secondary wireless communication device. Each notification, for example, may specify which instant message the notification is about and whether the instant message is to be deleted or to have a change made in the status of its read/unread flag.

The security module 213 is configured to require authorization before allowing the proxy module 207 to send the messages that are received from the secondary wireless communication device and before allowing the synchronization module 209 to replicate the messages that are sent and received by the messaging module 201 in the secondary wireless communication device.

Any means may be employed to facilitate this authorization. Examples are discussed below in connection with the secondary wireless communication device illustrated in FIG. 3.

The user interface 215 may be of any type. For example, the user interface may consist of or include a keyboard, display, touch screen, pointing device, microphone, loud speaker, and/or camera. The user interface 215 is configured to compose instant messages from information provided by a user and to communicate the content of received instant messages to a user.

Figure 3:
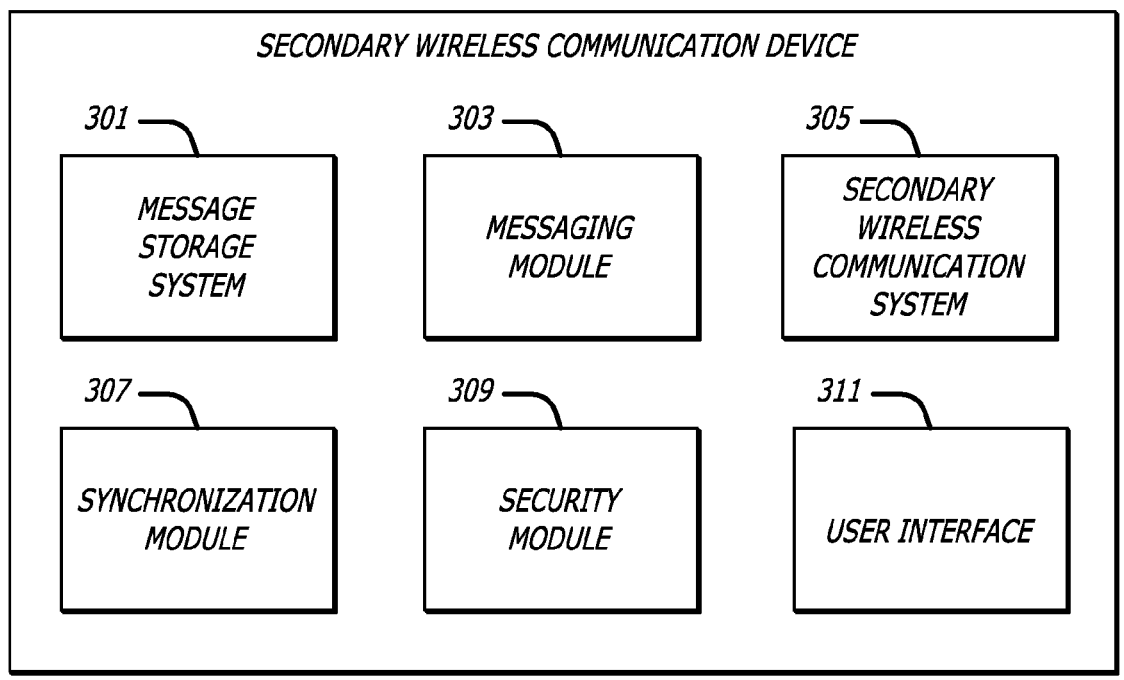
FIG. 3 illustrates an example of one of the secondary wireless communication devices illustrated in FIG. 1.

FIG. 3 illustrates an example of one of the secondary wireless communication devices illustrated in FIG. 1. As illustrated in FIG. 3, the secondary wireless communication device may include a message storage system 301, a messaging module 303, a secondary wireless communication system 305, a synchronization module 307, a security module 309, and a user interface 311.

The message storage system 301 is configured to store instant messages, such as SMS and/or MMS messages. The message storage system 301 may include one or more RAMS, flash memories, hard disk drives, and/or other types of computer data storage devices storage.

The messaging module 303 is configured to allow a user to create instant messages. Each instant message is addressed to a cellular target communication device at a cellular communication network address. The messaging module 303 is configured to store the messages in the message storage system 301. The messaging module 303 is configured to read messages that are stored in the message storage system 301.

The secondary wireless communication system 305 is configured to wirelessly communicate with a primary wireless communication device, such as the primary wireless communication device 101 or 103, other than through a cellular communication network. For example, the secondary wireless mobile communication system 305 may be configured to communicate with the primary wireless communication device using a short range communication network, such as Bluetooth and/or Wi-Fi.

The synchronization module 307 is configured to send the instant messages that are created using the messaging module 303 through the secondary wireless communication system 305 to a primary wireless communication device, such as the primary wireless communication device 101 or 103, which is not at the cellular communication network address to which each instant message is addressed. The synchronization module 307 is also configured to receive instant messages from the primary wireless mobile communication through the secondary wireless communication system 305 that are addressed to the primary wireless communication device. The synchronization module 307 is configured to store the received messages in the message storage system 301.

As indicated above, a read/unread (or other) flag may be associated with each instant message. The synchronization module 307 may be configured to replicate a change in the status of the read/unread flag made in the secondary wireless communication device in the primary cellular communication device and vice versa.

The messaging module 303 may be configured to allow a user to delete an instant message. The synchronization module 307 may be configured to cause a message that has been deleted by the user to be deleted from the primary cellular communication device. Similarly, the synchronization module 307 may be configured to cause a message that has been deleted by the primary wireless communication device to be deleted from the secondary wireless communication device.

To facilitate message deletion and/or changes in the status of the read/unread flag, the synchronization module 307 may be configured to send and receive a notification to and from the primary wireless communication device. Each notification may identify a specific instant message and indicate whether the status of its read/unread flag is to be changed or whether it is to be deleted.

The security module 309 is configured to require authorization before allowing the synchronization module 307 to send or receive messages. Any means may be provided to facilitate this functionality. For example, the security module 309 may cause the secondary wireless communication system 305 to initiate a scan for all Wi-Fi hot spots that are in communication range of the secondary wireless communication device and for all primary wireless communication devices that are in communication with these Wi-Fi spots. A list of all such primary wireless communication devices may be provided on the user interface 311. The user may then select one or more of these primary wireless communication devices. The secondary wireless communication system 305 may then deliver a request to pair with each selected primary wireless communication device.

The corresponding security module in the primary wireless communication device, such as the security module 213, may be configured to receive this pairing request and, in response, communicate a security code to the user of the primary wireless communication device through the user interface 215. The security code may or may not be unique and may be optional or required. The user of the secondary wireless communication device may then enter the unique security code that is provided on the primary wireless communication device into the secondary wireless communication device through the user interface 311. The security module 309 may then cause the secondary wireless communication system 305 to return this unique security code back to the primary wireless communication device. The security module 213 in the primary wireless communication device may then compare the security code that it received from the secondary wireless communication device with the one it communicated through the user interface 311. If there is a match, the security module 213 may then permit the primary wireless communication device to communicate with the secondary wireless communication device.

In another configuration, the secondary wireless communication device may request a user name and password through the user interface 311 and deliver what is received using the secondary wireless communication system 305 to the primary wireless communication device. In turn, the security module 213 in the primary wireless communication device may verify the user name and password and, once verified, permit further communications between the two.

The user interface 315 is configured to allow messages to be composed by the messaging module 301 and to communicate messages that are received to a user. The user interface 315 may be of any type and may have any of the components discussed above in connection with the user interface 215.

Figure 4:
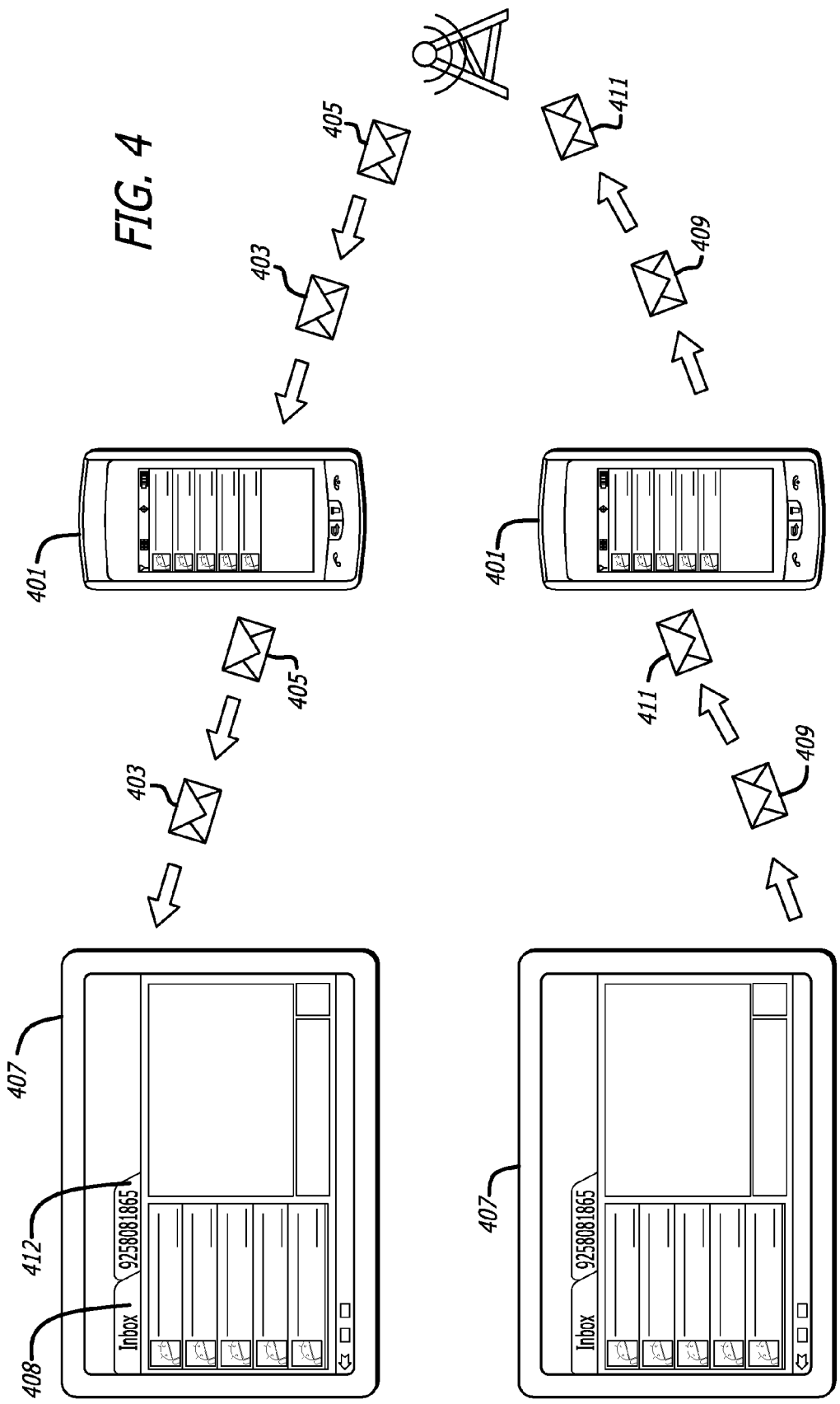
FIG. 4 illustrates examples of message flow between one of the primary and one of the secondary wireless communication devices illustrated in FIG. 1.

FIG. 4 illustrates examples of message flow between one of the primary and one of the secondary wireless communication devices illustrated in FIG. 1. As illustrated in FIG. 4, a primary wireless communication device 401 receives messages 403 and 405 and delivers these messages to a secondary wireless communication device 407. The secondary wireless communication device 407 has a tabbed window 408 in which the messages from the primary wireless communication device 401 are displayed. The secondary wireless communication device 407 may also have an additional tabbed window 411 in which messages that are received by the secondary wireless communication device 407 from a different account are displayed. In an alternate configuration, the secondary wireless communication device 407 may not have the tabbed window 412, but may only present the messages received from the primary wireless communication device 401.

Correspondingly, the secondary wireless communication device 407 may generate one or more instant messages 409 and 411 and deliver those to the primary wireless communication device 401 for delivery into a cellular communication network, such as the cellular communication network 405.

Figure 5:
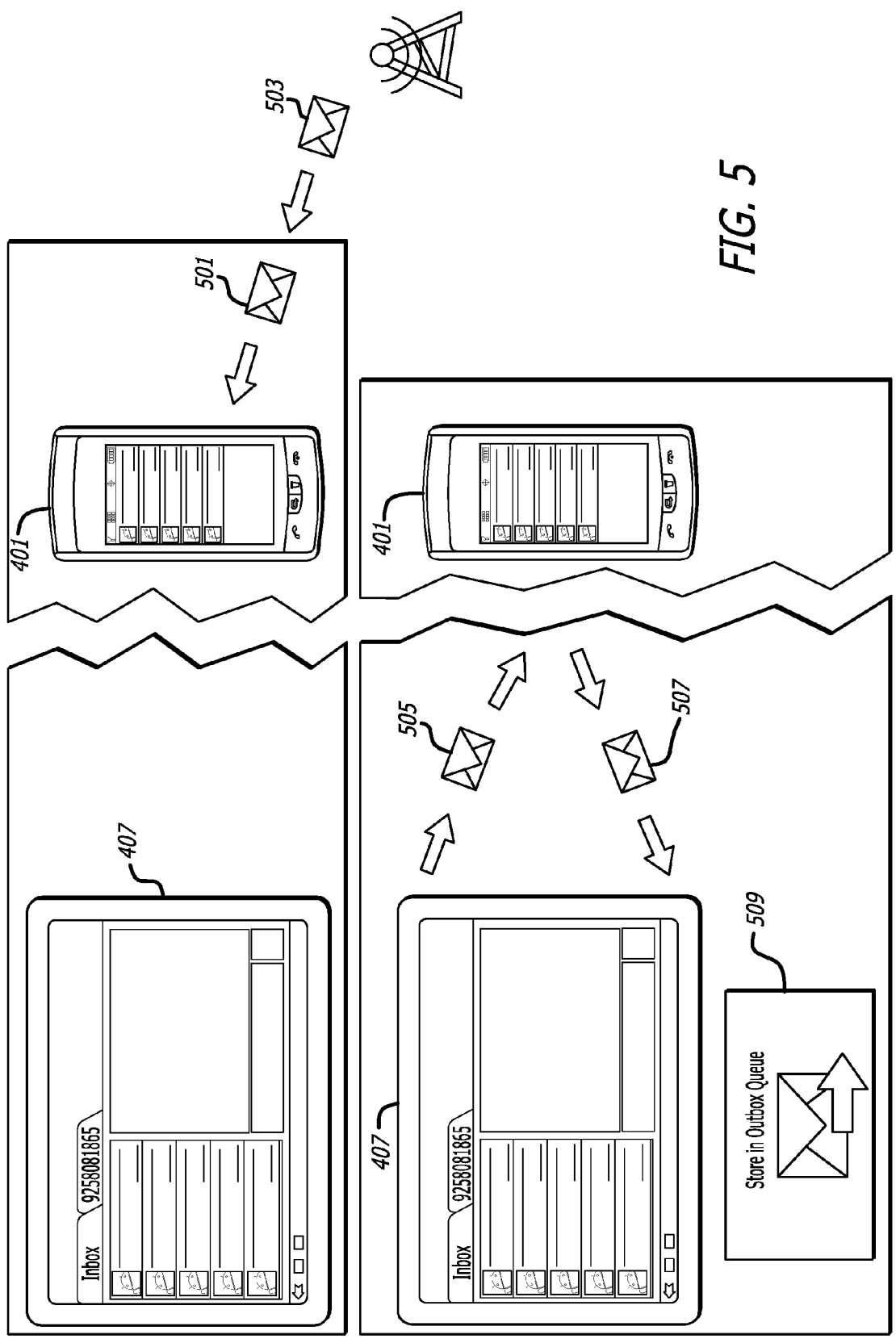
FIG. 5 illustrates examples of message flow within one of the primary and one of the secondary wireless communication devices illustrated in FIG. 1 when not in communication with one another.

FIG. 5 illustrates examples of message flow within one of the primary and one of the secondary wireless communication devices illustrated in FIG. 1 when not in communication with one another. As illustrated in FIG. 5, a secondary wireless communication device 407 is currently not in communication with a primary wireless communication device 401. This may be caused, for example, by the two devices being too far apart for communication to take place between the two, because a radio transmitter or receiver in one of the devices has been turned off, and/or because the devices have not yet been paired.

In any event, messages may be received by the primary wireless communication device 401 while not in communication with the secondary wireless communication device 407, such as messages 501 and 503. Copies of these messages may be stored in the primary wireless communication device 401 while not in communication with the secondary wireless communication device 407.

Similarly, message may be generated in the secondary wireless communication device 407, such as messages 505 and 507. These messages may be stored in a queue 509 within the secondary wireless communication device 407 while not in communication with the primary wireless communication device 401.

Figure 6:
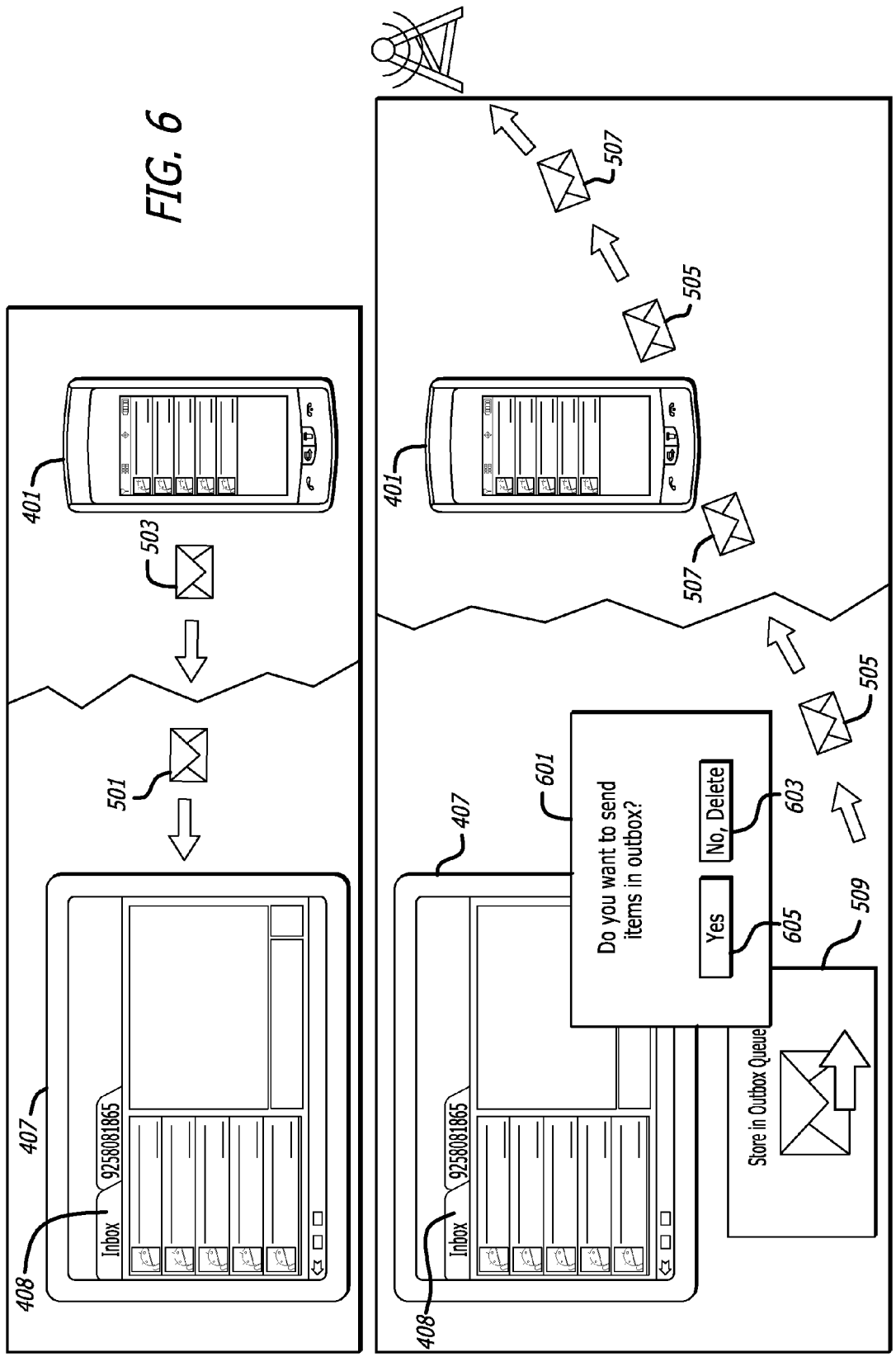
FIG. 6 illustrates examples of the flow of preexisting messages between one of the primary and one of the secondary wireless communication devices illustrated in FIG. 1, after communication between the two has been established.

FIG. 6 illustrates examples of the flow of preexisting messages between one of the primary and one of the secondary wireless communication devices illustrated in FIG. 1, after communication between the two has been established. As illustrated in FIG. 6, secondary wireless communication device 407 is now in communication with primary wireless communication device 401. During this time, messages 501 and 503 which had previously been stored within the primary wireless communication device 401 are now delivered to the secondary wireless communication device 407 for placement in its inbox in a tabbed window 408.

Similarly, messages 505 and 507 that were stored in the queue 509 of the secondary wireless communication device 407 may now be delivered to the primary wireless communication device 401 and then delivered by the primary wireless communication device 401 into the cellular communication network.

Before doing so, however, the synchronization module 301 in the secondary wireless communication device 407 is configured to ask the user whether the user wants to send the messages which have been formulated on the secondary wireless communication device 407 and stored in its queue to the primary wireless mobile communication device 401 for delivery into the cellular communication network. A dialog box 601 is used for this purpose. In some situations, the messages may no longer be sufficiently current. For example, the messages may no longer be relevant. Their delivery may thus be canceled by the user selecting a "No, Delete" button 603, in which case the unsent messages may be deleted or moved to a draft folder in the secondary and/or primary communication devices. In other cases, the user may still want the messages to be delivered, in which case the user may click a "Yes" button 605. If the "Yes" button is clicked, the queued messages 505 and 507 are then delivered to the primary wireless communication device 401, and then delivered into the cellular communication network by the primary wireless communication device 401. A flag or other type of marking may be provided to distinguish messages that originate from the secondary wireless communication device as contrasted to messages that originate from the primary wireless communication device. This flag or other type of marking may or may not be visible to the recipient of the message.

The synchronization module 301 may be configured to automatically check the age of each waiting message in the queue of the secondary wireless communication device 407 after communication with the primary wireless communication device 401 has been established. If the age is less than a pre-determined amount—which may be controlled by a user setting—the synchronization module 301 may be configured to automatically cause the message to be sent to the primary wireless communication device 401 for delivery into the cellular communication network, without first asking the user for permission. This may be done on the assumption that a message that is less than the pre-determined age will always still be relevant.

Figure 7:
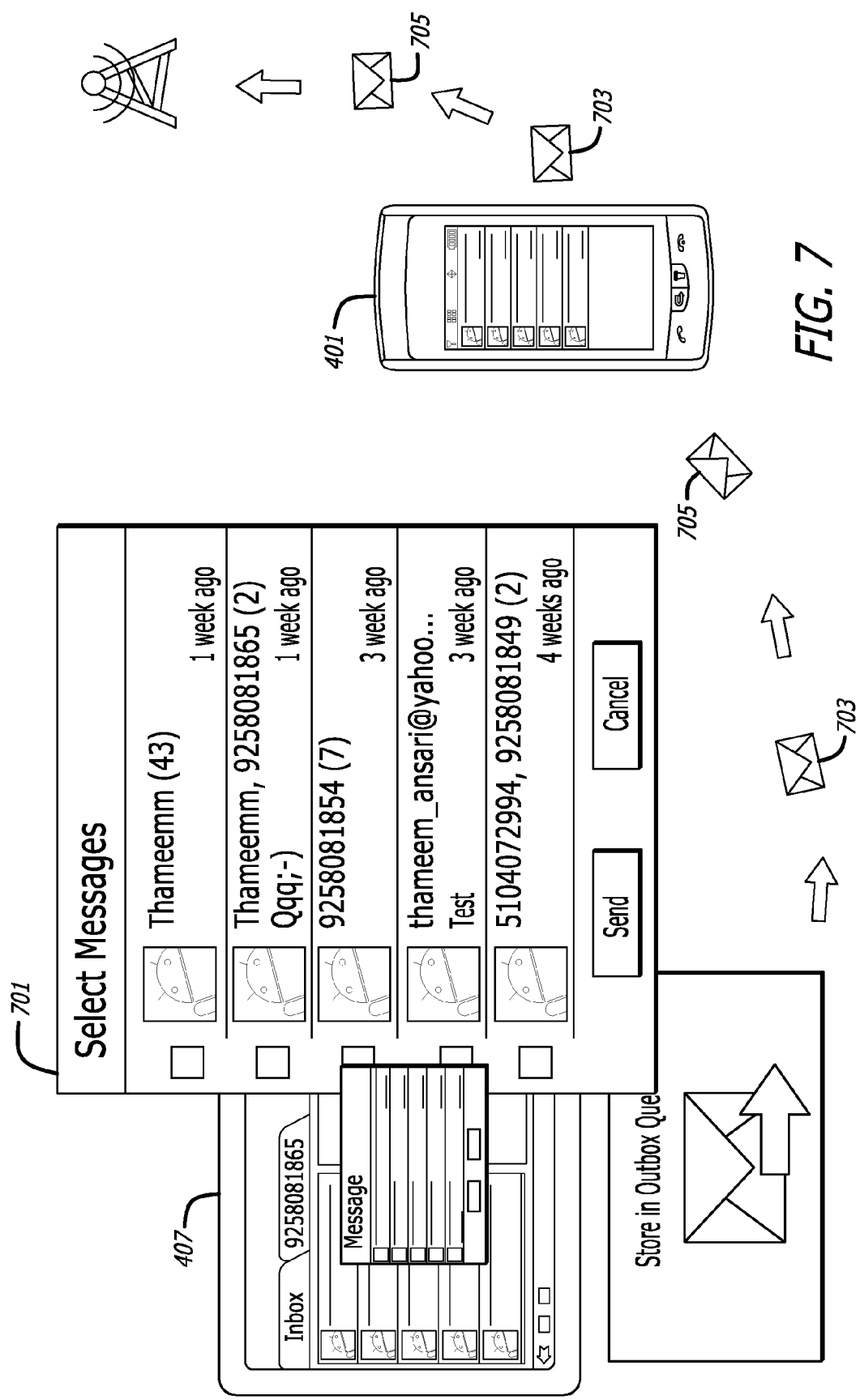
FIG. 7 illustrates a different example of the flow of preexisting messages between one of the primary and one of the secondary wireless communication devices illustrated in FIG. 1, after communication between the two has been established.

FIG. 7 illustrates a different example of the flow of preexisting messages between one of the primary and one of the secondary wireless communication devices illustrated in FIG. 1, after communication between the two has been established. FIG. 7 is similar to FIG. 6, except that a menu of queued messages is displayed after the user selects the "Yes" button 605 in FIG. 6. The user may then select which of the queued messages the user wishes to send to the primary wireless communication device 401 for delivery into the wireless communication network. A dialog box 701 is used for this purpose. Thereafter, the queued and selected messages 703 and 705 are delivered from the secondary wireless communication device 407 to the primary wireless communication device 401, and then into the cellular communication network.

FIG. 8 illustrates an example of options in a synching option table. This synching can be done as soon as information becomes available to sync or in accordance with a schedule which may be periodic. A user-specified option may be provided to allow the user to select the desired approach. As illustrated in FIG. 8, the secondary wireless communication device may generate, send to the primary wireless communication device, and receive from the primary wireless communication device more than simply instant messages. Correspondingly, more than simply instant messages may be synchronized between the two devices. Information such as contacts, draft messages, delivery reports (e.g., indicating whether a message has been sent or received), message notifications (e.g., indicating a failure in delivery), signatures, quick text, personalization, and other types of information may also be shared and/or synchronized between the primary and secondary wireless communication devices. The status of the sharing and synchronization of each of these types of information may be specified by a user and/or at the factory and indicated in the option table, as also illustrated in FIG. 8.

Unless otherwise indicated, the messaging modules, proxy modules, synchronization modules, and security modules that have been discussed are each implemented with a computer system configured to perform the functions that have been described herein for the component. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. A primary wireless communication device comprising:
   a cellular communication system configured to wirelessly communicate instant messages over a cellular communication network;
   a message storage system configured to store instant messages;
   a messaging module configured to allow a user to create instant messages, each addressed to a target cellular communication device at a cellular communication network address, to send the messages through the cellular communication system to the target cellular communication device to which they are addressed, to receive instant messages addressed to the primary wireless communication device from the cellular communication system, to store the sent and received instant messages in the message storage system, and to read the sent and received instant messages in the message storage system;
   a secondary wireless communication system configured to wirelessly communicate with a secondary wireless communication device other than through the cellular communication network;
   a proxy module configured to receive instant messages from the secondary wireless communication system that come from the secondary wireless communication device, each instant message from the secondary wireless communication system being addressed to a target cellular mobile communication device at a cellular communication network address that is not an address of the primary wireless communication device, and to send the received messages from the secondary wireless communication system to the target cellular mobile communication device through the cellular communication system; and
   a synchronization module configured to:
      cause the instant messages that are sent and received by the messaging module to be replicated in the secondary wireless communication device; and
      cause the instant messages that are received by the proxy module from the secondary wireless communication device to be replicated in the message storage system.

2. The primary wireless communication device of claim 1 further comprising a security module configured to require authorization before allowing the proxy module to send the instant messages that are received from the secondary wireless communication device and before allowing the synchronization module to replicate the instant messages that are sent and received by a messaging module in the secondary wireless communication device.

3. The primary wireless communication device of claim 1 wherein:
   a read/unread flag is associated with each instant message; and the synchronization module is configured to replicate a change in the status of the read/unread flag made by one of the wireless communication devices with the other wireless communication device.

4. The primary wireless communication device of claim 1 wherein:
the messaging module is configured to allow the user to delete an instant message; and
the synchronization module is configured to:
cause an instant message that has been deleted from one of the primary or secondary wireless communication device to be subsequently deleted from the other of the primary or secondary wireless communication device.

5. The primary wireless communication device of claim 1 wherein the cellular communication network address of the target mobile cellular communication device is a cellular phone number.

6. The primary wireless communication device of claim 1 wherein the synchronization module is configured to:
cause instant messages that were sent and received by the primary cellular communication device over the cellular communication network while not in communication with the secondary wireless communication device to be replicated in the secondary wireless communication device after communication between the primary cellular communication device and the secondary wireless communication device is subsequently established; and
cause instant messages that were created in the secondary wireless communication device while not in communication with the primary cellular communication device to be received from the secondary wireless communication device, sent over the cellular communication network, and stored in the message storage system, after communication between the secondary wireless communication device and the primary cellular communication device is subsequently established.

7. The primary wireless communication device of claim 1 wherein the messaging module, the secondary wireless communication system, and the proxy module are configured to perform their respective functions, as recited in claim 1, in connection with multiple different secondary wireless communication devices.

8. The primary wireless communication device of claim 1 wherein the secondary wireless communication system is configured to communicate with the secondary wireless communication device using a short range network.

9. The primary wireless communication device of claim 1 wherein the secondary wireless communication system is configured to communicate with the secondary wireless communication device to provide the only avenue for communication of instant messages between the secondary wireless communication device and the cellular communication network.

10. A secondary wireless communication device comprising:
a message storage system configured to store instant messages;
a messaging module configured to allow a user to create instant messages, each addressed to a target cellular mobile communication device at a cellular communication network address, to store the instant messages in the message storage system, and to read the instant messages in the message storage system;
a secondary wireless communication system configured to wirelessly communicate instant messages with a primary wireless communication device other than through a cellular communication network; and
a synchronization module configured to send the instant messages through the secondary wireless communication system to a primary wireless communication device that is not at the cellular communication network address, to receive instant messages from the primary wireless communication device through the secondary wireless communication system that are addressed to the primary wireless communication device, and to store the received instant messages in the message storage system;
wherein the synchronization module is configured to:
cause instant messages that were created in the messaging module while the secondary wireless communication device was not in communication with the primary cellular communication device to be sent to the primary cellular communication device after communication between the secondary wireless communication device and the primary cellular communication device is established; and
cause instant messages that were sent and received by the primary cellular communication device while not in communication with the secondary wireless communication device to be received from the primary cellular communication device and stored in the message storage system after communication between the secondary wireless communication device and the primary cellular communication device is established.

11. The secondary wireless communication device of claim 10 further comprising a security module configured to require authorization before allowing the synchronization module to send or receive the messages.

12. The secondary wireless communication device of claim 10 wherein:
a read/unread flag is associated with each instant message; and
the synchronization module is configured to replicate a change in the status of the read/unread flag made in one of the wireless communication devices with the other wireless communication device.

13. The secondary wireless communication device of claim 10 wherein:
the messaging module is configured to allow a user to delete an instant message; and
the synchronization module is configured to cause a message that has been deleted in one of the wireless communication devices to be subsequently deleted from the other wireless communication device.

14. The secondary wireless communication device of claim 10 wherein the cellular communication network address of the target mobile cellular communication device is a cellular phone number.

15. The secondary wireless communication device of claim 10 wherein the messaging module includes a user interface configured to signal to a user when the secondary wireless communication device and the primary cellular communication device are in communication with one another.

16. The secondary wireless communication device of claim 10, wherein the synchronization module is configured to seek user permission before causing one or more of the messages that were created in the messaging module while the secondary wireless communication device was not in communication with the primary cellular communication device to be sent to the primary cellular communication device after communication between the secondary wireless communication device and the primary cellular communication device is established.

17. The secondary wireless communication device of claim 10 wherein the secondary wireless communication system is configured to communicate with the primary cellular communication device using a short range network.

18. The secondary wireless communication device of claim 10 wherein the secondary wireless communication system is configured to communicate with the primary cellular communication device to provide the only avenue for communication of instant messages between the secondary wireless communication device and the cellular communication network.

19. The secondary wireless communication device of claim 10 wherein the secondary wireless communication device is a tablet computer.

20. A wireless communication system comprising:
a primary wireless communication device; and
a secondary wireless communication device;
the primary wireless communication device comprising:
   a cellular communication system configured to wirelessly communicate instant messages over a cellular communication network, the cellular communication system having a first cellular communication network address;
   a first message storage system configured to store instant messages;
   a first messaging module configured to allow a user to create instant messages, each addressed to a target cellular communication device at a cellular communication network address that is different from the first cellular communication network address, to send the messages through the cellular communication system to the target cellular communication device to which they are addressed, to receive instant messages addressed to the primary wireless communication device from the cellular communication system, to store the sent and received instant messages in the first message storage system, and to read the sent and received instant messages from the first message storage system;
   a first secondary wireless communication system configured to wirelessly communicate with the secondary wireless communication device other than through the cellular communication network;
   a proxy module configured to receive instant messages from the secondary wireless communication system that come from the secondary wireless communication device, each instant message from the secondary wireless communication system being addressed to a target cellular mobile communication device at a cellular communication network address that is not the first cellular communication network address, and to send the received messages from the secondary wireless communication system to the target cellular mobile communication device through the cellular communication system; and
   a first synchronization module configured to:
      cause the instant messages that are sent and received by the first messaging module to be replicated in the secondary wireless communication device; and
      cause the instant messages that are received by the first proxy module from the secondary wireless communication device to be replicated in the first message storage system;
the secondary wireless communication device comprising:
   a second message storage system configured to store instant messages;
   a second messaging module configured to allow a user to create instant messages, each addressed to a target cellular mobile communication device at a cellular communication network address that is not the first cellular communication network address, to store the instant messages in the second message storage system, and to read the instant messages in the second message storage system;
   a second secondary wireless communication system configured to wirelessly communicate instant messages with the primary wireless communication device other than through a cellular communication network; and
   a second synchronization module configured to send the instant messages through the second secondary wireless communication system to the primary wireless communication device, to receive instant messages from the primary wireless communication device through the secondary wireless communication system that are addressed to the primary wireless communication device, and to store the received instant messages in the second message storage system.

* * * * *